(12) United States Patent
Uenishi

(10) Patent No.: US 10,410,080 B2
(45) Date of Patent: Sep. 10, 2019

(54) NC-PROGRAM CONVERSION DEVICE

(71) Applicant: FANUC CORPORATION, Yamanashi (JP)

(72) Inventor: Daisuke Uenishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/014,023

(22) Filed: Jun. 21, 2018

(65) Prior Publication Data
US 2019/0005345 A1 Jan. 3, 2019

(30) Foreign Application Priority Data

Jul. 3, 2017 (JP) .................. 2017-130355

(51) Int. Cl.
G06K 9/00 (2006.01)
G06K 9/34 (2006.01)
G06K 9/03 (2006.01)
G06K 7/00 (2006.01)

(52) U.S. Cl.
CPC ......... *G06K 9/344* (2013.01); *G06K 9/00442* (2013.01); *G06K 9/03* (2013.01); *G06K 9/342* (2013.01); *G06K 2209/01* (2013.01)

(58) Field of Classification Search
CPC .................... G06K 9/00; G06F 3/00
USPC .......................................... 382/182
See application file for complete search history.

(56) References Cited

U.S. PATENT DOCUMENTS 5,818,952 A * 10/1998 Takenouchi ....... G06K 9/00442
382/101

8,965,126 B2 * 2/2015 Yamazoe ............... G06K 9/723
382/177

FOREIGN PATENT DOCUMENTS

| JP | S55115175 A | 9/1980 |
| JP | H05-035323 | 2/1993 |
| JP | H06-114678 | 4/1994 |
| JP | H08185485 A | 7/1996 |
| JP | H09251515 A | 9/1997 |
| JP | 2000-163111 | 6/2000 |
| JP | 2003-108918 | 4/2003 |
| JP | 2006-058930 | 3/2006 |
| JP | 2011-018108 | 1/2011 |

(Continued)

OTHER PUBLICATIONS

Japanese Decision to Grant a Patent dated Jan. 15, 2019, for Japanese Patent Application No. 2017-130355.

*Primary Examiner* — Abolfazl Tabatabai

(74) *Attorney, Agent, or Firm* — Karceski IP Law, PLLC

(57) ABSTRACT

An NC-program conversion device includes an OCR processing unit that recognizes a character string from an input image; a first storage unit that stores one alphabetic letter and the number of digits of a number subsequent to the alphabetic letter, in an associated manner; a second storage unit that stores a program code that is composed of a combination of one alphabetic letter and a two-character number and an effective character that is composed of one alphabetic letter subsequent to the program code, in an associated manner; and a character-string segmenting unit that refers to the first storage unit and the second storage unit, to segment each line of the character string, which is recognized by the OCR processing unit, as program codes stored in the first storage unit in an associated manner.

5 Claims, 7 Drawing Sheets

(56) References Cited

FOREIGN PATENT DOCUMENTS

JP   2016224602 A   12/2016
JP   2017016549 A   1/2017

* cited by examiner

FIG. 2

NUMERICAL-FORM FORMAT EXAMPLE

```
---NUMERICAL FORM    LAST THREE DIGITS---
CODE                 DIGIT
O                    ****
G                    **
M                    **
XYZABC               ******, ***
IJK                  *****, ****
SF                   *****, ****
THD                  ***
:                    :
```

```
---NUMERICAL FORM    LAST FOUR DIGITS---
CODE                 DIGIT
O                    *****
G                    **
M                    **
XYZABC               ******, *****
IJK                  ******, *****
SF                   ******, *****
THD                  ***
:                    :
```

FIG. 3

CODE-FORM FORMAT EXAMPLE

| ---CODE FORM--- | | | ---CODE FORM--- | |
|---|---|---|---|---|
| | THREE AXES--- | | | FIVE AXES--- |
| CODE | EFFECTIVE CHARACTER | | CODE | EFFECTIVE CHARACTER |
| G00 | X Y Z F | | G00 | X Y Z A B C F |
| G01 | X Y Z F | | G01 | X Y Z A B C F |
| G03 | X Y Z I J K F | | G03 | X Y Z I J K F |
| G28 | X Y Z | | G28 | X Y Z A B C |
| G43 | X Y Z H | | G43 | X Y Z H |
| M06 | T | | M06 | T |
| M03 | S | | M03 | S |
| ⋮ | ⋮ | | ⋮ | ⋮ |

FIG. 4

| NUMERICAL VALUE | ALPHABETIC LETTER | | |
|---|---|---|---|
| | CANDIDATE 1 | CANDIDATE 2 | CANDIDATE 3 |
| 0 | O | D | Q |
| 1 | I | J | |
| 2 | Z | | |
| 3 | B | W | |
| 4 | A | | |
| 5 | S | | |
| 6 | O | | |
| 7 | I | J | |
| 8 | B | | |
| 9 | O | | |

NC-PROGRAM CONVERSION DEVICE

CROSS-REFERENCE TO RELATED APPLICATIONS

This application is based on and claims priority to Japanese Patent Application No. 2017-130355, filed on Jul. 3, 2017, the entire contents of which are incorporated herein by reference.

FIELD OF THE INVENTION

The present invention relates to an NC-program conversion device.

BACKGROUND OF THE INVENTION

In the related art, there is a known character recognition device that reads an image of an application form and that applies OCR (optical character reader) processing to the read image to recognize characters, thus making description-data entry work efficient (for example, see Japanese Unexamined Patent Application, Publication No. 2003-108918).

In this character recognition device, characters that tend to be mistaken are registered in advance, and a character that is incorrectly recognized as a result of character recognition is replaced with the most likely character among the registered characters.

SUMMARY OF THE INVENTION

The present invention provides the following solutions.

According to one aspect, the present invention provides an NC-program conversion device including: an OCR processing unit that recognizes a character string from an input image; a first storage unit that stores one alphabetic letter and the number of digits of a number subsequent to the alphabetic letter, in an associated manner; a second storage unit that stores a program code that is composed of a combination of one alphabetic letter and a two-character number and an effective character that is composed of one alphabetic letter subsequent to the program code, in an associated manner; and a character-string segmenting unit that refers to the first storage unit and the second storage unit, to segment each line of the character string, which is recognized by the OCR processing unit, as program codes that are each composed of one alphabetic letter and a number corresponding to the number of digits stored in the first storage unit in an associated manner.

BRIEF DESCRIPTION OF THE DRAWINGS

FIG. 2 is a view showing an example numerical-form format stored in a storage unit that is provided in the NC-program conversion device shown in FIG. 1.

FIG. 3 is a view showing an example code-form format stored in the storage unit, which is provided in the NC-program conversion device shown in FIG. 1.

FIG. 4 is a view showing an example numeral-letter conversion list stored in the storage unit, which is provided in the NC-program conversion device shown in FIG. 1.

FIG. 6 is a view showing (a) an example of an input handwritten document, (b) an example of a result obtained after OCR processing is applied to the handwritten document shown in (a), and (c) an example of an NC program generated by the NC-program conversion device of this embodiment.

FIG. 7 is a view showing (a) another example of an input handwritten document, (b) another example of a result obtained after OCR processing is applied to the handwritten document shown in (a), and (c) another example of an NC program generated by the NC-program conversion device of this embodiment.

BRIEF DESCRIPTION OF EMBODIMENT(S) OF THE INVENTION

An NC-program conversion device 1 according to one embodiment of the present invention will be described below with reference to the drawings.

Figure 1:
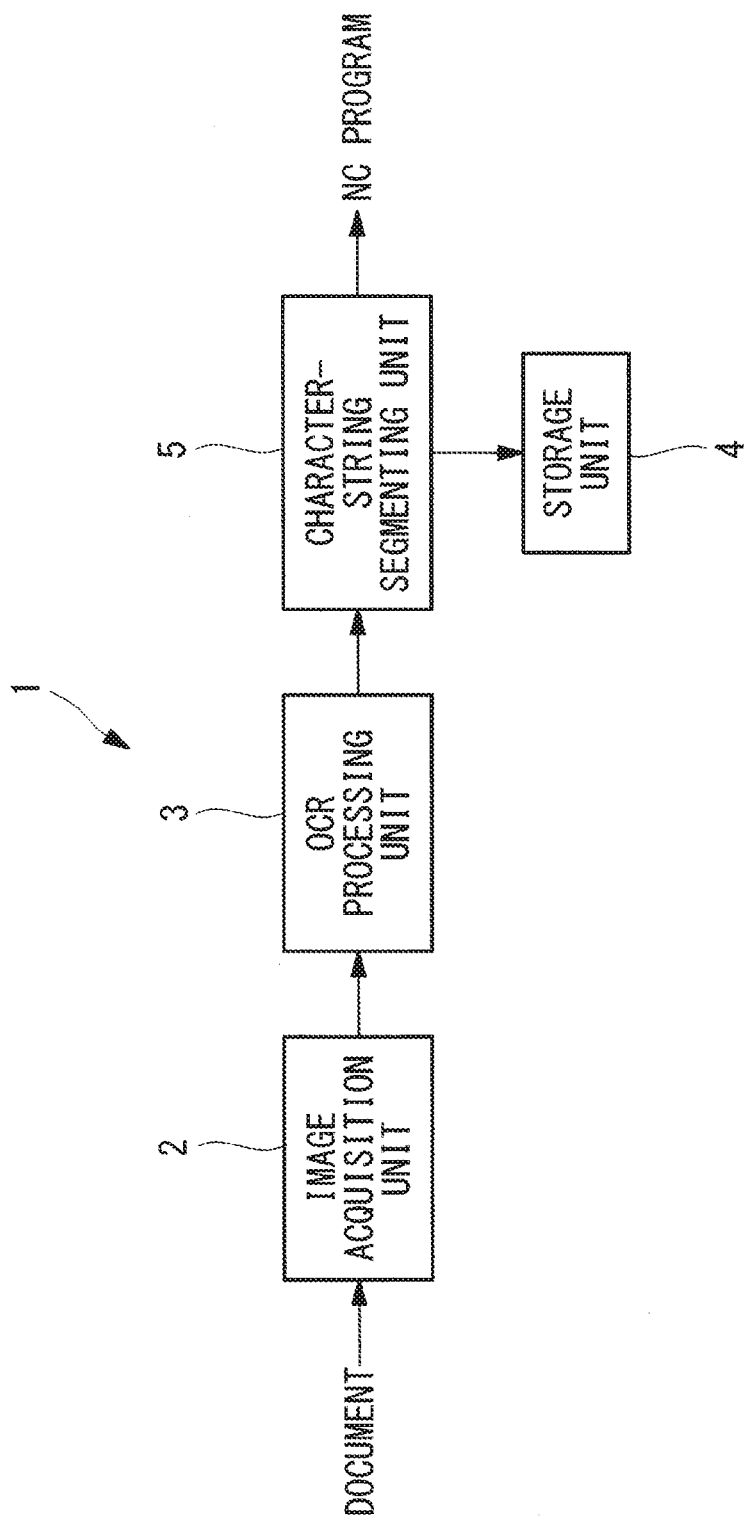
FIG. 1 is a block diagram showing an NC-program conversion device according to one embodiment of the present invention.

As shown in FIG. 1, the NC-program conversion device 1 of this embodiment is provided with: an image acquisition unit 2 that captures handwritten characters, a printed document, or a document sent by facsimile, thus acquiring an image thereof; an OCR processing unit 3 that recognizes character strings from the image acquired by the image acquisition unit 2; a storage unit 4 that stores a numerical-form format (first storage unit), a code-form format (second storage unit), and a numeral-letter conversion list (third storage unit); and a character-string segmenting unit 5 that converts the character string recognized by the OCR processing unit 3 on the basis of the formats and the list stored in the storage unit 4.

As shown in FIG. 2, in the numerical-form format, one alphabetic letter and the number of digits of a number subsequent to the alphabetic letter are associated with each other, and a plurality of such combinations are stored.

As shown in FIG. 3, in the code-form format, program codes that are each composed of a combination of one alphabetic letter and a two-character number are each stored in association with at least one effective character that is composed of one alphabetic letter subsequent to the program code.

As shown in FIG. 4, the numeral-letter conversion list stores numbers and alphabetic letters that tend to be mistaken for these numbers, in an associated manner.

The character-string segmenting unit 5 searches for any of the alphabetic letters stored in the numerical-form format, from the beginning of each line of a character string that is obtained from an image by the OCR processing unit 3, and reads, from the numerical-form format, the number of digits of a number subsequent to the found alphabetic letter.

Then, it is determined whether the read alphabetic letter and a predetermined number of digits of a number subsequent to this alphabetic letter exist in the code-form format. If they exist, this combination of the alphabetic letter and the number is segmented as a program code. At the same time, it is determined whether a character subsequent to the program code is an effective character that is stored in the code-form format in an associated manner. If the character is any effective character, it is determined that a number subsequent to the effective character is a number that has the number of digits stored in the numerical-form format in an associated manner, they are segmented as a program code that is composed of the effective character and the number, and the same processing is performed on a subsequent character.

Then, in this way, all character strings converted by the OCR processing unit 3 are segmented in a set of a plurality of program codes, thereby making it possible to generate an NC program that is input to an NC controller and that can put a machine, such as a machine tool, into operation.

The operation of the thus-configured NC-program conversion device 1 of this embodiment will be described below.

Figure 5:
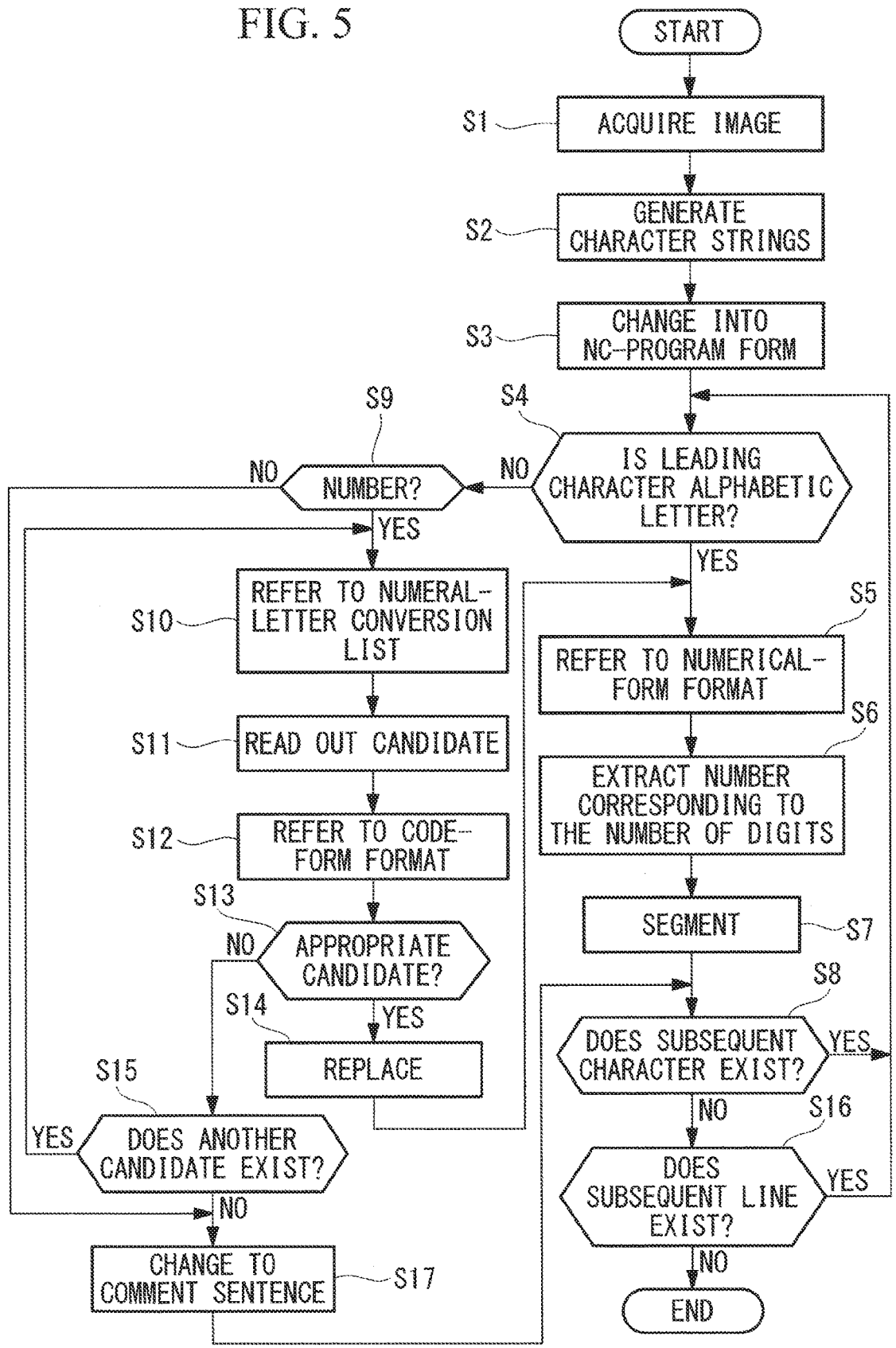
FIG. 5 is a flowchart for explaining the operation of the NC-program conversion device shown in FIG. 1.

In order to generate an NC program from a document printed on paper, by using the NC-program conversion device 1 of this embodiment, as shown in FIG. 5, the image acquisition unit 2 acquires an image of the document (Step S1), and the OCR processing unit 3 recognizes the image to generate character strings (Step S2).

Next, a character, e.g., "%", indicating the start and the end of the NC program is assigned to positions flanking the generated character strings, thus changing the character strings into an NC-program form (Step S3).

In this state, program codes that function as the NC program are generated from the recognized character strings subsequent to "%".

Specifically, the character-string segmenting unit 5 first determines whether the leading character of a character string in the first line is an alphabetic letter (Step S4). If the leading character thereof is an alphabetic letter, the character-string segmenting unit 5 refers to the numerical-form format stored in the storage unit 4 (Step S5), extracts, from the character string subsequent to this alphabetic letter, a number corresponding to the number of digits stored in association with this alphabetic letter (Step S6), and segments them as a program code (Step S7).

For example, in a case in which an image of a handwritten document, such as that shown in FIG. 6(*a*), is acquired, when the OCR processing unit 3 recognizes character strings, as shown in FIG. 6(*b*), it is determined whether the first character "G" is an alphabetic letter (Step S4). Since "G" is an alphabetic letter, the numerical-form format is referred to (Step S5), the number of digits "2" for a number subsequent to "G" is read (Step S6), two characters "43" subsequent to "G" in the character string shown in FIG. 6(*b*) are recognized as a number, and a program code "G43" is segmented (Step S7).

Next, it is determined whether a subsequent character exists (Step S8). If a subsequent character exists, the process steps from Step S4 are repeated.

In the above-described example, since a character string "250.H01" subsequent to "G43" exists, the process steps from Step S4 are repeated.

In this case, in Step S4, it is determined that the leading character "2" is not an alphabetic letter. Because a program code that is composed of only numbers or symbols does not exist in an NC program, the process flow advances to Step S9, and it is determined whether this character "2" is a number.

Since "2" is a number, the numeral-letter conversion list, which is stored in the storage unit 4, is referred to (Step S10), and "Z", which is a candidate stored in association with "2", is read (Step S11).

Next, the code-form format, which is stored in the storage unit 4, is referred to (Step S12), and it is determined whether "Z" read in Step S11 is appropriate (Step S13). Whether "Z" is appropriate is determined depending on whether it is an effective character that is stored in association with the program code in the code-form format.

In the above-described example, because the alphabetic letter "Z" is an effective character in the program code "G43", it is determined that "Z" is appropriate, and the number "2" is replaced with the alphabetic letter "Z" (Step S14). Then, the numerical-form format is again referred to (Step S5), and the number of digits of a number subsequent to the replaced "Z" is read (Step S6). Because a three-digit or four-digit numerical form after a decimal point is associated with "Z", a three-digit or four-digit number including a decimal point ". (period)" is read from a number subsequent to "Z"; however, "0 (zero)" after the decimal point can be omitted.

In the above-described example, because the character subsequent to "." is "H", it is determined that every "0" subsequent to "." is omitted, and "50." is read as a number subsequent to "Z". Specifically, "Z50." is segmented as a program code (Step S7).

In a case in which it is determined, in Step S4, that the leading character is not an alphabetic letter, and in which it is determined, in Step S9, that the leading character is not a number, for example, if the leading character is "0", because a plurality of candidates are stored in association with "0" in the numeral-letter conversion list, it is determined, in Step S13, whether candidate 1 is appropriate. If it is determined that the candidate 1 is not appropriate, it is determined whether there is another candidate (Step S15). If there is another candidate, the process steps from Step S10 are repeated.

In the above-described example, when "H01" at the end of the first line is segmented as a program code, because a subsequent character does not exist in this line (Step S8), it is determined whether there is a subsequent line (Step S16). If there is a subsequent line, the process steps from Step S4 are repeated.

Specifically, in the above-described example, "51000" in the second line is replaced with a program code "S1000", "2-10." in the third line is replaced with "Z-10.", "150." in the fourth line is replaced with "I50.", and "G2820" in the fifth line is replaced with "G28Z0".

Then, when segmentation of program codes has finished for the character strings in all lines, the processing ends.

Furthermore, if it is determined, in Step S9, that the leading character is not a number, and if it is determined, in Step S15, that there is no other candidate, while an appropriate candidate is not found in Step S13, that character is changed to a comment sentence (Step S17). The change of a character to a comment sentence is performed by surrounding the character with "( ) (brackets)". Then, after the character is changed to the comment sentence, the process steps from Step S8 are repeated.

For example, when an image shown in FIG. 7(*a*) is subjected to OCR processing, thereby recognizing character strings shown in FIG. 7(*b*), because it is determined, in Step S4, that "." at the end of the first line and at the end of the second line is not an alphabetic letter, and it is also determined, in Step S9, that "." is not a number, "." is surrounded with ( ) in Step S17, thereby obtaining comment sentences shown in FIG. 7(*c*).

Although segmented parts of the program codes are separated by spaces for clarification in FIG. 6(*c*) and FIG. 7(*c*), no space is required in practice. Furthermore, in FIG. 6(*c*), alphabetic letters that tend to be mistaken for numbers, stored in the numeral-letter conversion list are indicated as bold characters.

In this way, according to the NC-program conversion device 1 of this embodiment, an NC program that can function in an NC controller can be generated from character strings obtained by recognizing an image of handwritten or printed characters. Specifically, if the handwritten or printed characters are simply converted into most probable characters, there are cases in which they are converted into character strings that do not function as an NC program, and characters or symbols that are originally unnecessary are converted; however, according to the NC-program conversion device 1 of this embodiment, there is an advantage in that it is possible to generate an executable NC program and to execute the NC program to check for the presence or absence of a failure therein.

In particular, a character that is originally unnecessary is recorded in the form of a comment sentence, which does not interfere with the function of the NC program, thereby making it possible to generate the NC program without overlooking an original failure.

Furthermore, in particular, in a machine tool that often uses a different NC-program format for each machine, checking of the machine in which a failure occurs in the NC program is not easy because it is necessary to have a good knowledge of the machine, so that there is a case in which a machine maker is hired to check the failure. In this case, output of data serving as electronic information is often restricted in view of preventing information leakage, so that there are cases in which the machine maker is asked to check an NC program recorded on printed matter or a handwritten paper medium.

According to the NC-program conversion device 1 of this embodiment, it is possible not only to simply convert an NC program provided in the form of a paper medium or the like into electronic information but also to generate electronic information that functions as an executable NC program. Accordingly, there is an advantage in that failure checks can be immediately executed by the machine maker.

Note that, in this embodiment, for example, when an alphabetic letter "O" indicating a program number is recognized as the leading character, a four-digit character subsequent thereto can be judged as a "number". For example, when a character string recognized from an image is "Ooool", it is also possible to convert "o (lower-case character)" into "0 (zero)" on the basis of the numeral-letter conversion list, thus generating a program code "O0001".

Furthermore, in the same way, when an alphabetic letter "O" is recognized as the leading character, and a character string subsequent thereto is not a four-digit number, e.g., it is "1", it is also possible to add three "0 (zeros)" between "O" and "1", thus generating a program code "O0001".

Furthermore, because some program codes, such as a G-code, function as preceding modal instruction, even if a G-code does not exist in the same line, and a recognized leading character is an effective character string premised on a G-code etc., it is possible to use the recognized leading character as an effective character for the G-code existing in the previous line to generate a program code.

From the above-described embodiments and modifications thereof, the following aspects of the invention are derived.

According to one aspect, the present invention provides an NC-program conversion device including: an OCR processing unit that recognizes a character string from an input image; a first storage unit that stores one alphabetic letter and the number of digits of a number subsequent to the alphabetic letter, in an associated manner; a second storage unit that stores a program code that is composed of a combination of one alphabetic letter and a two-character number and an effective character that is composed of one alphabetic letter subsequent to the program code, in an associated manner; and a character-string segmenting unit that refers to the first storage unit and the second storage unit, to segment each line of the character string, which is recognized by the OCR processing unit, as program codes that are each composed of one alphabetic letter and a number corresponding to the number of digits stored in the first storage unit in an associated manner.

According to this aspect, when the OCR processing unit converts an input image into character strings, the character-string segmenting unit refers to the first storage unit and the second storage unit and segments each line of character strings into program codes that are each composed of one alphabetic letter and a number corresponding to the number of digits stored in the first storage unit in an associated manner. In an NC program, because a program code is always composed of a combination of one alphabetic letter and a number, when a program code that is composed of one alphabetic letter that is stored in the first storage unit and a two-character number is recognized in a character string, for example, it is possible to estimate that the subsequent characters are any effective character stored in the second storage unit and a number having the number of digits stored in the first storage unit. Accordingly, the recognized character string can be converted so as to function as an NC program.

The above-described aspect may further include a third storage unit that stores a number and alphabetic letters that tend to be mistaken for this number, in an associated manner, wherein, when a leading character in each segment of the character string, which is recognized by the OCR processing unit, is a number, the character-string segmenting unit may replace the number with any of the alphabetic letters stored in the third storage unit in an associated manner.

By doing so, because there is no program code in which the leading character in each segment is a number, if the leading character is a number, the number is replaced with an alphabetic letter stored in the third storage unit in association with the number, thereby making it possible to convert it so as to function as an NC program.

In the above-described aspect, when the leading character of the character string, which is recognized by the OCR processing unit, is any alphabetic letter stored in the first storage unit, the character-string segmenting unit may replace a character string subsequent to this alphabetic letter with a number corresponding to the number of digits stored in the first storage unit in an associated manner.

By doing so, it is possible to easily segment a recognized character string into a plurality of program codes and to convert it so as to function as an NC program.

In the above-described aspect, when the leading character of the character string, which is recognized by the OCR processing unit, is "O", and the number of digits of a number subsequent thereto is less than four digits, the character-string segmenting unit may add zero between the leading character and the subsequent number to replace the subsequent number with a four-digit number.

By doing so, even in a case in which a line starting with "O" is recognized as a program number, and the number of digits of a number subsequent to "O" is reduced so as to have less than four digits, zero is added before the number to replace the number with a four-digit number, thereby making it possible to convert it so as to function as an NC program.

In the above-described aspect, the character-string segmenting unit may convert a character that does not correspond to any program code, of the character string, which is recognized by the OCR processing unit, into a comment sentence.

By doing so, if a character does not correspond to any program code, i.e., if a character does not correspond to any alphabetic letter stored in the first storage unit, to a number having the number of digits stored in association with the alphabetic letter, or to any effective character stored in the second storage unit, the character that does not correspond to any of them is formed into a comment sentence, thereby making it possible to perform conversion so as to function as an NC program.

According to the present invention, an advantageous effect is afforded in that a recognized character string can be converted so as to function as an NC program.

The invention claimed is:

1. An NC-program conversion device comprising:
   an OCR processing unit that recognizes a character string from an input image;
   a first storage unit that stores one alphabetic letter and the number of digits of a number subsequent to the alphabetic letter, in an associated manner;
   a second storage unit that stores a program code that is composed of a combination of one alphabetic letter and a two-character number and an effective character that is composed of one alphabetic letter subsequent to the program code, in an associated manner; and
   a character-string segmenting unit that refers to the first storage unit and the second storage unit, to segment each line of the character string, which is recognized by the OCR processing unit, as program codes that are each composed of one alphabetic letter and a number corresponding to the number of digits stored in the first storage unit in an associated manner.

2. An NC-program conversion device according to claim 1, further comprising a third storage unit that stores a number and alphabetic letters that tend to be mistaken for this number, in an associated manner,
   wherein, when a leading character in each segment of the character string, which is recognized by the OCR processing unit, is a number, the character-string segmenting unit replaces the number with any of the alphabetic letters stored in the third storage unit in an associated manner.

3. An NC-program conversion device according to claim 1, wherein, when the leading character of the character string, which is recognized by the OCR processing unit, is any alphabetic letter stored in the first storage unit, the character-string segmenting unit replaces a character string subsequent to this alphabetic letter with a number corresponding to the number of digits stored in the first storage unit in an associated manner.

4. An NC-program conversion device according to claim 3, wherein, when the leading character of the character string, which is recognized by the OCR processing unit, is "O", and the number of digits of a number subsequent thereto is less than four digits, the character-string segmenting unit adds zero between the leading character and the subsequent number to replace the subsequent number with a four-digit number.

5. A NC-program conversion device according to claim 1, wherein the character-string segmenting unit converts a character that does not correspond to any program code, of the character string, which is recognized by the OCR processing unit, into a comment sentence.

* * * * *